Nov. 15, 1949     M. R. HUTCHISON, JR     2,487,875
MIRROR MOUNT FOR BENT LIGHT BEAM OPTICAL SYSTEMS
Filed Sept. 18, 1948
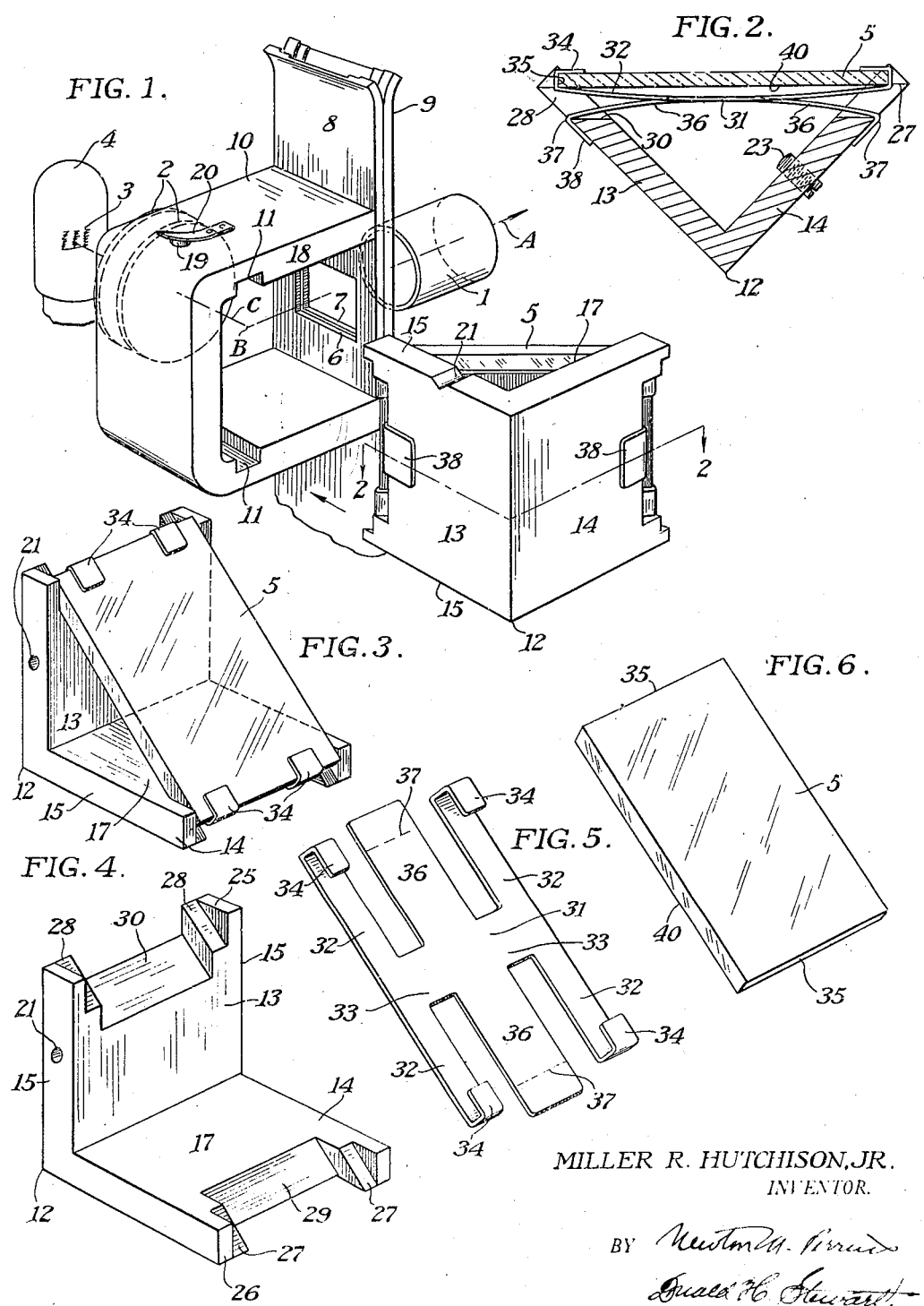
MILLER R. HUTCHISON, JR.
INVENTOR.
BY
ATTORNEYS Patented Nov. 15, 1949

2,487,875

UNITED STATES PATENT OFFICE 2,487,875

MIRROR MOUNT FOR BENT LIGHT
BEAM OPTICAL SYSTEMS

Miller R. Hutchison, Jr., Rochester, N. Y., assignor
to Eastman Kodak Company, Rochester, N. Y.,
a corporation of New Jersey Application September 18, 1948, Serial No. 49,868

6 Claims. (Cl. 88—92)

This application relates to a mirror mount, particularly useful in an optical system in which the axis of the system is bent. Such optical systems are frequently used in motion-picture projectors and cameras. One object of my invention is to provide an improved form of mirror mount so constructed that an unskilled user may insert and remove the mirror mount for cleaning without disturbing the accurate plane in which the mirror lies when in an operative position in the system. Another object of my invention is to provide a mount for precisely holding a mirror with respect to an optical system. A still further object of my invention is to provide an improved form of mirror mount which is simple and inexpensive and which may be assembled, by relatively unskilled help, accurately in the optical system. A still further object of my invention is to provide a mirror mount which is extremely compact and which can be inserted in an optical system in which the parts are crowded together, leaving but little room for this part of the optical system. Other objects will appear from the following specification, the novel features being particularly pointed out in the claims at the end thereof.

In many optical systems, such as the optical systems frequently used in motion-picture projectors and cameras, the axis of the optical system is bent or reflected by means of a mirror, usually to produce a more compact piece of apparatus. In the drawings I have shown, as an example of my invention, a bent optical system as applied to a motion-picture projector. Obviously, such a mirror mount may be applied to different optical systems and I have shown only a typical system which, in this instance, includes a lamp, condenser lenses, a mirror, and an objective.

Coming now to the drawings wherein like reference characters denote like parts throughout:

Fig. 1 is a perspective view of my improved form of mirror mount, ready for insertion into an optical system to bend the axis of this system; the remaining parts of a projector, for which this system was particularly designed, not being shown;

Fig. 2 is a section taken on line 2—2 through the mirror mount and mirror shown in Fig. 1;

Fig. 3 is a perspective view of the mirror and mount taken from the opposite side of the mirror and mount shown in Fig. 1; and Figs. 4, 5, and 6 are perspective views of the mirror mount, the mirror-retaining member, and the mirror before these three parts are assembled.

My present invention is particularly directed to an extremely simple, compact, and accurately formed means for positioning a mirror in an optical system to reflect, or bend, the axis of the system. The mount and support are particularly arranged so that they may be assembled and disassembled for cleaning. Such an optical system may be used in motion-picture projectors, and I have shown such an optical system schematically in the drawings of the present embodiment of my invention. A projector may include an optical system in which there is an objective 1 which may, as usual, be made up of a plurality of lenses. The axis A of this objective is bent, or reflected, at a point B so that, in the present instance, the axis C is at right angles to the axis A and passes through the center of condenser lenses 2. There are lamp filaments 3 of a lamp 4 located in the proper relationship to the axis C so that when a mirror 5 is positioned at the point of intersection B of the axes C and A, light rays, passing from the lamp 4 through the condenser lenses 2, will be reflected by the mirror 5 and will pass out through the objective 1. A standard type of film gate having registering frames 6 and 7 in a rear plate 8 and a front plate 9 may be employed to guide a film past the registering frames 6 and 7 which are in the focal plane of the objective 1. The film may be moved by any standard pull-down apparatus.

My improved form of mirror mount will now be described. Behind the fixed gate section 8 there is a support 10 having a pair of parallel-spaced slots 11. These slots are accurately machined in the support and are adapted to precisely locate a mirror mount designated broadly as 12. This mirror mount may comprise a pair of arms 13 and 14, here shown as being at right angles to each other. The extreme edges 15 of the arm 13 are precisely machined to slide and fit into the slots 11 of the support 10, so that the holder 12 may be accurately positioned with respect to the support 10. When the holder 12 of Fig. 1 is slid into the support 10 with the rails 15 engaging the slots 11, the holder will be accurately located by an inner wall 17 of the arm 14 when this wall strikes the flat surface 18 of the support 10. While it is not necessary to provide a means for latching the holder 12 in place, a ball 19 pressed downwardly by a spring 20 may be snapped into an indentation 21 in one of the rails 15, if a snap-latch should appear to be desirable. It is also not necessary to provide an adjusting means for locating the holder 12 relative to the support 10 other than the flange 17 and 18 for instance, but if this should be desirable, a set screw 23 may be provided in the arm 14 of the holder 12 so that this set screw can be used as a final adjustment of the mirror 5 relative to the optical system.

The mirror mount is extremely simple and, referring to Fig. 4, the mount 12 consists of an L-shaped member, the arms 13 and 14 of which are similarly formed on their outer ends 25 and 26. Each of these ends includes spaced mirror-locating pads 27 and 28 and relieved portions 29 and 30 between the mirror-locating pads. These pads 27 and 28 are accurately formed to hold the mirror in the required plane.

Fig. 5 shows the mirror-retaining member 31 which preferably consists of a single plate made of more or less resilient material and slotted to form a series of parallel arms. The arms 32, which are the outer arms in the present instance, are connected to the main portion of the plate 31 by narrow necks 33. These arms can be assembled to the mirror by folding over the ends 34 over the ends 35 of the mirror so that the mirror will be held by these arms. The arms 36, in this instance, pass between the arms 32 and may be assembled to the mirror mount 12 by folding these arms along the broken lines 37 of Fig. 5, back around the relieved portions 29 and 30 of the mount 12 into the folded position shown at 38 in Fig. 1.

The proportions of the parts are such that all of the arms 32 and 36 lie between the mirror-locating pads 27 and 28 and in the clearance portions 29 and 30 of the arms 14 and 15. This is best illustrated in Fig. 2. It will be noticed from this figure that the resilient arms 32 are folded forwardly over the edges 35 of the mirror, and that the arms 36 are folded rearwardly over the edges of the cut-out portions 29 and 30. Thus, they tend to pull against each other and resiliently hold the rear surface 40 of the mirror against the mirror-locating pads 27 and 28. This is important because in the optical system above described very considerable heat is often created and it is necessary, for best results, to hold a mirror in a position in which it may move somewhat without moving from the plane in which it must lie to maintain an accurate position. The single spring plate 31 is of rather light-weight springy metal and the spring of the arms 32 and 36 is sufficient to hold the mirror 5 accurately in the plane defined by the locating pads 27 and 28. At the same time expansion and contraction of the various parts is permitted within limits and since the mirror mount 12 is rigidly made of a single piece of metal, or other suitable material, the mirror always remains in the proper plane regardless of its temperature.

It should be noticed also that the mirror mount constructed in accordance with the present embodiment of my invention is extremely easy to remove for cleaning and reinsert in the apparatus. This may be done by drawing the mirror mount 12 outwardly, releasing the rails 15 from their complementary-shaped grooves 11 in the mount so that the mirror may be cleaned and easily reinserted in the apparatus. Because the rails 15 and the grooves 11 are parallel to a portion of the axis, here shown as C, of the optical system, the location of the mirror with respect to the axis C is always accurate, and by providing a stop which may be the flanged ends 17 and 18 of the mirror mount and supports 27 and 28 in the right position, the mirror will always be accurately aligned with the axis A. As is indicated in the drawings, my improved mirror mount is not only simple and inexpensive, but it is also very compact and requires extremely little space to accurately mount the mirror so that its reflecting surface will exactly coincide with the intersection of the axes A and C of the optical system to be bent by the mirror.

While I have described and shown in the drawing an improved embodiment of my invention in which a mirror mount and support is used as a portion of an optical system employed in a motion-picture projector, it is obvious that such a system may be useful for other apparatus, such as a photographic camera, or magazine where it is desired to bend the axis of an optical system at right angles. I include as within the scope of my invention all such forms and modifications as come within the scope of the appended claims.

Having thus described my invention, what I claim as new and desire to secure by Letters Patent of the United States is:

1. A mirror mount for use in motion-picture apparatus of the type including a bent optical system, a lens having an axis, and a mirror for reflecting light rays passing through the lens and changing the direction of the optical system, said mount for the mirror comprising, in combination, a slotted support, a mirror mount having rails fitting and slidable into the slotted mount, spaced arms on the mount including mirror-locating pads, and a mirror-retaining member to hold the mirror against the locating pads and including resilient legs, some of which are formed over in one direction to engage edges of the mirror, others of which are formed over to engage the spaced arms of the mount.

2. The mirror mount as defined in claim 1 characterized by the spaced arms of the mirror mount being angularly disposed and the rails fitting and slidable into the slotted mount being carried by one of the arms of the mirror mount.

3. The mirror mount as defined in claim 1 characterized by the spaced arms of the mirror mount being disposed at right angles to each other, and the rails fitting and slidable into the slotted mount being carried by one arm.

4. The mirror mount as defined in claim 1 characterized by the spaced arms of the mirror mount being disposed at right angles to each other, and the rails fitting and slidable into the slotted mount being carried by one arm, said slots in which the rails slide extending parallel to one part of the axis of the optical system, and a stop for limiting the movement of the mirror mount relatively to the slotted support to position the mirror accurately in the optical path.

5. The mirror mount as defined in claim 1 characterized by the mirror-retaining member including resilient legs being a single plate of resilient metal slotted to form a plurality of parallel legs, certain legs formed forwardly over edges of the mirror, certain other legs formed rearwardly over the edges of the arms of the support whereby the ends of the legs, through the resiliency of the metal plate, hold the mirror against the locating pads as the mirror engaging legs and the mirror mount engaging legs act against each other.

6. The mirror mount as defined in claim 1 characterized by the mirror-retaining member including resilient legs being a single plate of resilient metal slotted to form a plurality of arms, the mirror mount having clearance slots in the arms between the mirror-locating pad for the reception of resilient legs bent over on the mirror mount and for the reception of the mirror holding legs bent over in an opposite direction upon the mirror, whereby the resilient metal of the plate may hold the mirror upon the mirror-positioning pads permitting movement of the mirror on the pads and in its plane due to heat through the flexibility of said resilient metal mirror retaining member.

MILLER R. HUTCHISON, Jr.

No references cited.